United States Patent [19]

Shiomi et al.

[11] Patent Number: 5,180,319
[45] Date of Patent: Jan. 19, 1993

[54] JOINT STRUCTURE WITH ELASTIC MOUNT

[75] Inventors: Kazuyuki Shiomi, Saitama; Mitsuharu Tanaka, Tokyo; Kazuomi Kiku; Akihisa Saito, both of Saitama, all of Japan

[73] Assignee: Honda Giken Kogyo Kabushiki Kaisha, Tokyo, Japan

[21] Appl. No.: 691,644

[22] Filed: Apr. 25, 1991

[30] Foreign Application Priority Data

Apr. 25, 1990 [JP] Japan .................................. 2-109224

[51] Int. Cl.⁵ ............................................ B63H 21/30
[52] U.S. Cl. ...................................... 440/52; 248/640
[58] Field of Search ......................... 440/52, 53, 61, 62, 440/63; 248/609, 635, 640, 659; 267/153, 141, 293

[56] References Cited

U.S. PATENT DOCUMENTS

| | | | |
|---|---|---|---|
| 2,916,007 | 12/1959 | Kiekhaefer | 440/52 |
| 3,002,489 | 10/1961 | Watkins | 440/52 |
| 3,599,594 | 8/1971 | Talpale | 440/52 |
| 4,445,674 | 5/1984 | Clayton, Jr. | 267/153 |
| 4,507,090 | 3/1985 | Kobayashi | 440/52 |

FOREIGN PATENT DOCUMENTS 56-116597 9/1981 Japan .

*Primary Examiner*—Jesus D. Sotelo
*Attorney, Agent, or Firm*—Irving M. Weiner; Joseph P. Carrier; Pamela S. Burt

[57] ABSTRACT

A joint structure joins an outboard engine assembly to a boat hull. The outboard engine assembly has an engine, a case, a propeller rotatably supported on the case and drivable by the engine. The joint structure includes an attachment adapted to be coupled to the boat hull, the case having an inner surface defining an inner housing region, and elastic mount mechanism accommodated in the inner housing region for elastically supporting the case to the attachment. The elastic mount mechanism comprises a support member coupled to the attachment, and an elastic member disposed on the support member, the elastic member being elastically deformable from partial abutment to full abutment against a portion of the inner surface of the case in response to an increase in compressive forces which are applied between the case and the attachment when the engine is in operation. For example, the portion of the inner surface may include a flat inner surface substantially normal to the direction in which the compressive forces are applied, the elastic member having an outer surface facing the flat inner surface and having a plurality of protrusions which are elastically deformable from partial abutment to full abutment against the flat inner surface when the compressive forces are increased.

15 Claims, 15 Drawing Sheets

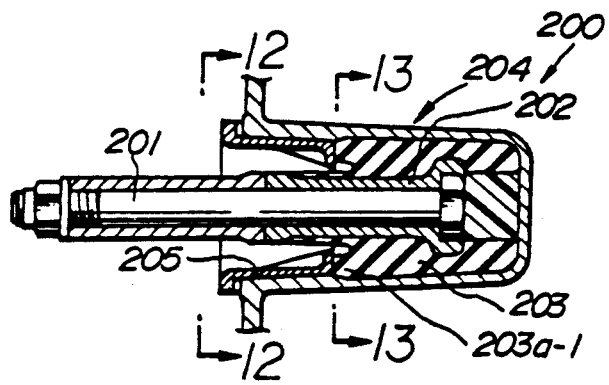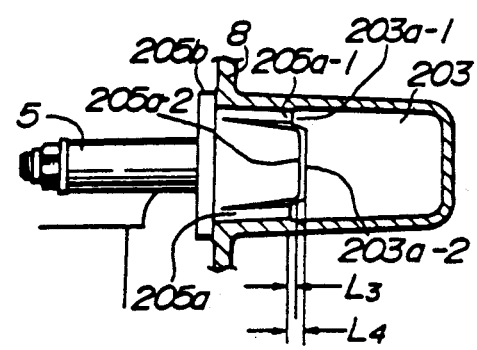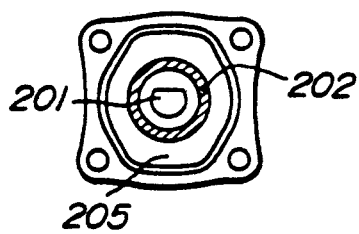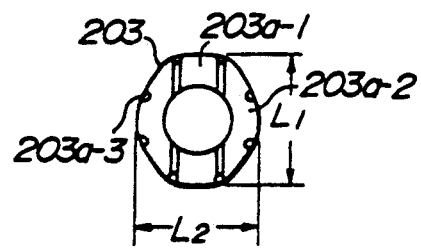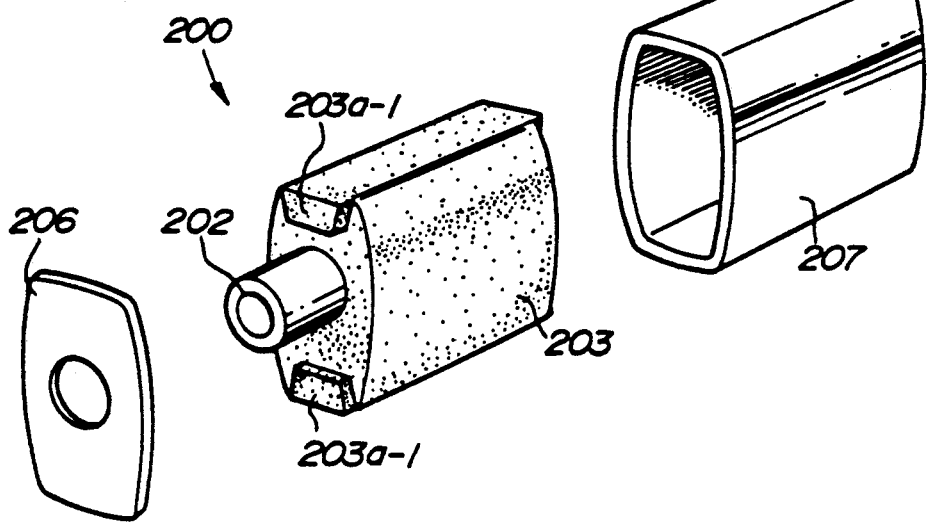

JOINT STRUCTURE WITH ELASTIC MOUNT

BACKGROUND OF THE INVENTION

1. Field of the Invention

The present invention relates to a joint structure for joining an outboard engine to boat hull, and more particularly to such a joint structure which has an elastic mount.

2. Description of the Prior Art

Generally, an outboard engine assembly comprises a vertically arranged engine with the crankshaft extending vertically. The engine is fastened to an extension case of an outboard engine assembly body. With the engine thus fastened, a crankshaft chamber housing a crankshaft is positioned forwardly, and a cylinder defining a combustion chamber and a cylinder head are positioned rearwardly. A vertical shaft for transmitting propulsive forces from the engine to a propeller extends through the extension case.

Joint structures for joining such outboard engine assemblies to boat hulls are disclosed in Japanese Laid-Open Patent Publication No. 56-116597, and U.S. Pat. Nos. 2,916,007, 3,002,489, and 3,599,594, for example.

According to the joint structures shown in Japanese Laid-Open Patent Publication No. 56-116597 and U.S. Pat. No. 2,916,007, a rubber member is interposed between inner and outer collars, and the inner collar is coupled to one member and the outer coller to another member. The joint structure disclosed in U.S. Pat. No. 3,002,489 includes three rubber members in each of upper and lower regions between members to be joined to each other. In the joint structure shown in U.S. Pat. No. 3,599,594, a crossbar extends through one member and has opposite ends fixed to another member, and a tubular rubber member is wound around the crossbar with a rubber strip in a portion of the other member.

Joint structures to be used between boat hulls and outboard engine assemblies are required to transmit propulsive forces efficiently from the outboard engine to the boat hull without power loss and also to prevent vibrations from being transmitted from the engine to the boat hull. While the elastic elements are employed in the joints for vibration absorption in the prior joint structures, no sufficient vibration absorbing capabilities have been achieved because of the contradictory natures of the efficient transmission of propulsive forces and the prevention of vibration transmission.

It has been considerably cumbersome to establish spring characteristics of the elastic elements. Other problems of the conventional joint structures are as follows:

In the conventional outboard engine assemblies, vibrations are produced about an axis, i.e., a torque roll axis, due to reactive forces generated in response to the drive torque of the engine, the torque roll axis being positioned substantially in the vicinity of the vertical shaft or slightly rearwardly of the vertical shaft. In the earlier joint structures, the position of the upper or lower mount is limited by the peripheral wall of the extension case which is spaced from the vertical shaft to avoid physical interference therewith, and is spaced from the torque roll axis. Such a configuration increases the rigidity of the elastic elements of rubber, making it difficult to reach the simultaneous achievement of supporting the weight of the outboard engine, giving a preferable steering feeling, and preventing the transmission of vibration.

SUMMARY OF THE INVENTION

In view of the aforesaid drawbacks of the conventional joint structures, it is an object of the present invention to provide a joint structure having elastic mount means for efficiently transmitting propulsive forces and absorbing vibrations from an outboard engine assembly to a boat hull.

According to the present invention, there is provided a joint structure for joining an outboard engine assembly to a boat hull, comprising an outboard engine assembly having an engine, a case, a propeller rotatably supported on the case and drivable by the engine, an attachment adapted to be coupled to a boat hull, the case having an inner surface defining an inner housing region, and elastic mount means accommodated in the inner housing region for elastically coupling the case to the attachment. The elastic mount means comprises a support member coupled to the attachment, and an elastic member disposed on the support member, the elastic member being elastically deformable from partial abutment to full abutment against a portion of the inner surface of the case in response to an increase in compressive forces which are applied between the case and the attachment when the engine is in operation.

For example, the portion of the inner surface may include a flat inner surface substantially normal to the direction in which the compressive forces are applied, and the elastic member may have a flat outer surface facing the flat inner surface and having a plurality of protrusions elastically deformable from partial abutment to full abutment against the flat inner surface when the compressive forces are increased. Additionally, the portion of the inner surface may include a flat inner surface substantially normal to the direction in which the compressive forces are applied, the flat inner surface having a plurality of protrusions, and the elastic member may have a flat outer surface facing the flat inner surface and which is elastically deformable from partial abutment to full abutment against the protrusion and the flat inner surface when the compressive forces are increased. Alternatively, the inner surface may include a flat inner surface parallel to the direction in which the compressive forces are applied, the elastic member having a flat outer surface facing the flat inner surface and having at least one protrusion with a relatively large damping capability for absorbing vibrations produced when the engine is in operation.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 11a is an enlarged cross-sectional view of the upper mount assembly according to the first embodiment;

FIG. 11b is an enlarged cross-sectional view showing the manner in which the upper mount assembly according to the first embodiment operates;

FIG. 12 is a cross-sectional view taken along line 12—12 of FIG. 11a;

FIG. 13 is a cross-sectional view taken along line 13—13 of FIG. 11a;

FIG. 15 is an exploded perspective view of a modification of the upper mount assembly and its housing according to the first embodiment;

DETAILED DESCRIPTION OF THE PREFERRED EMBODIMENTS

A joint structure according to a first embodiment of the present invention will be described below with reference to FIGS. 1 through 15.

Figure 1:
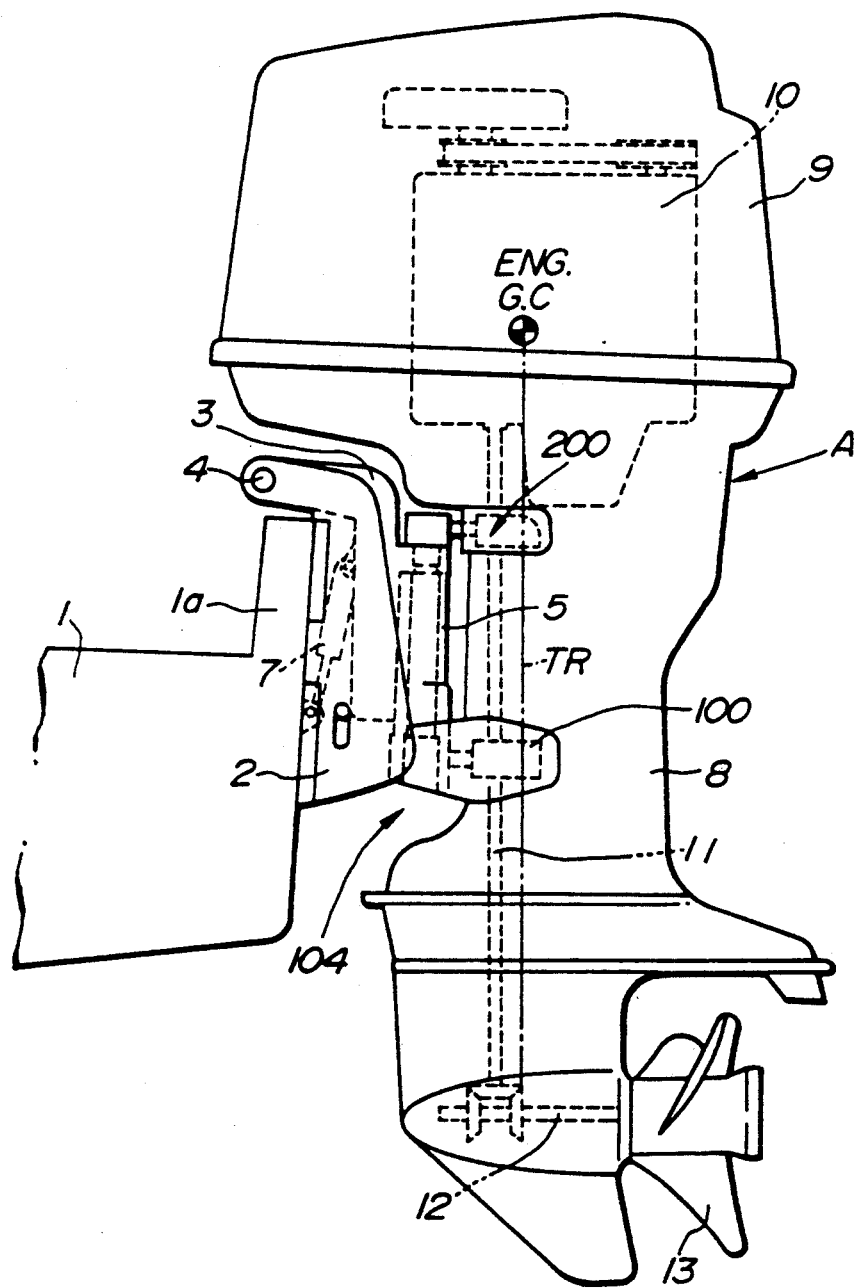
FIG. 1 is a schematic side elevational view of a rear boat hull and an outboard engine assembly, with a joint structure according to a first embodiment of the present invention therebetween.

As shown in FIG. 1, a pair of laterally spaced stern brackets 2 is fixedly mounted on the stern 1a of a boat hull 1. A swivel case 3 is vertically swingably supported on a tilt shaft 4 extending horizontally between the upper ends of the stern brackets 2. The swivel case 3 supports on its back a mount frame 5 which includes a vertically extending swivel shaft 5a (see FIG. 2) that is angularly movable about its own axis to steer the boat hull 1.

Figure 2:
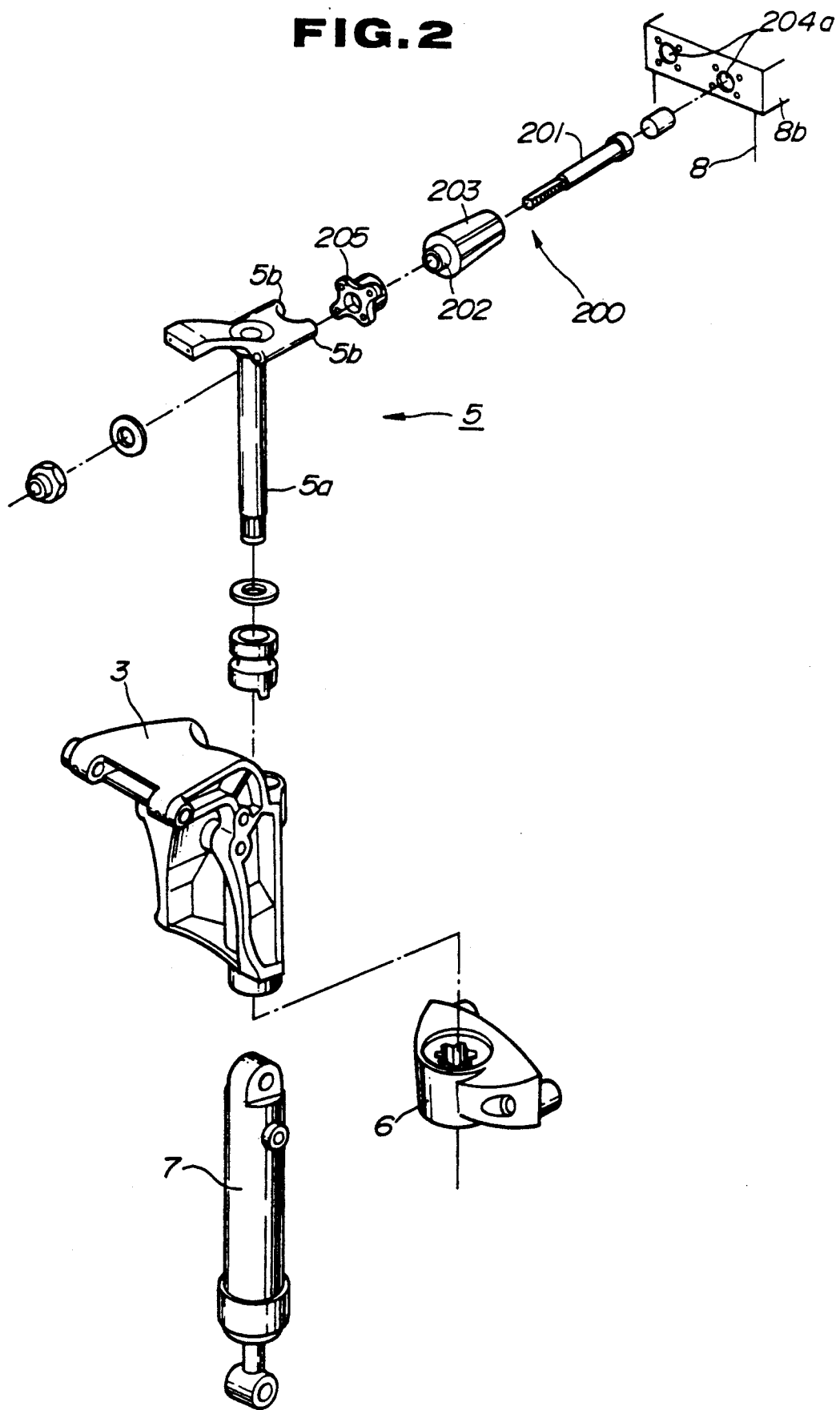
FIG. 2 is an exploded perspective view of an upper mount assembly and associated components in the joint structure according to the first embodiment.

As shown in FIGS. 1 and 2, the mount frame 5 comprises, in addition to the swivel shaft 5a, a central housing 6 splined to the lower end of the swivel shaft 5a, and a pair of laterally spaced attachments 5b on the upper end of the swivel shaft 5a. A lower mount assembly 100 is coupled to the central housing 6, and an upper mount assembly 200 is coupled to the attachments 5b. An outboard engine assembly A is mounted on the mount frame 5 by these lower and upper mount assemblies 100, 200. A tilt cylinder 7 has one end pivotally coupled to the stern brackets 2 and the other end to the swivel case 3, and the outboard engine assembly A vertically swings about the pivot shaft 4.

The outboard engine assembly A has an extension case 8 and an engine cover 9 which define an outer profile thereof, and an engine 10 housed in the engine cover 9. Propulsive drive forces generated by the engine 10 are transmitted through a vertical shaft 11 in the extension case 8 to a propeller shaft 12, thereby rotating a propeller or screw 13 that is operatively connected to the lower end of the vertical shaft 11.

The lower mount assembly 100 will now be described in detail below.

Figure 3:
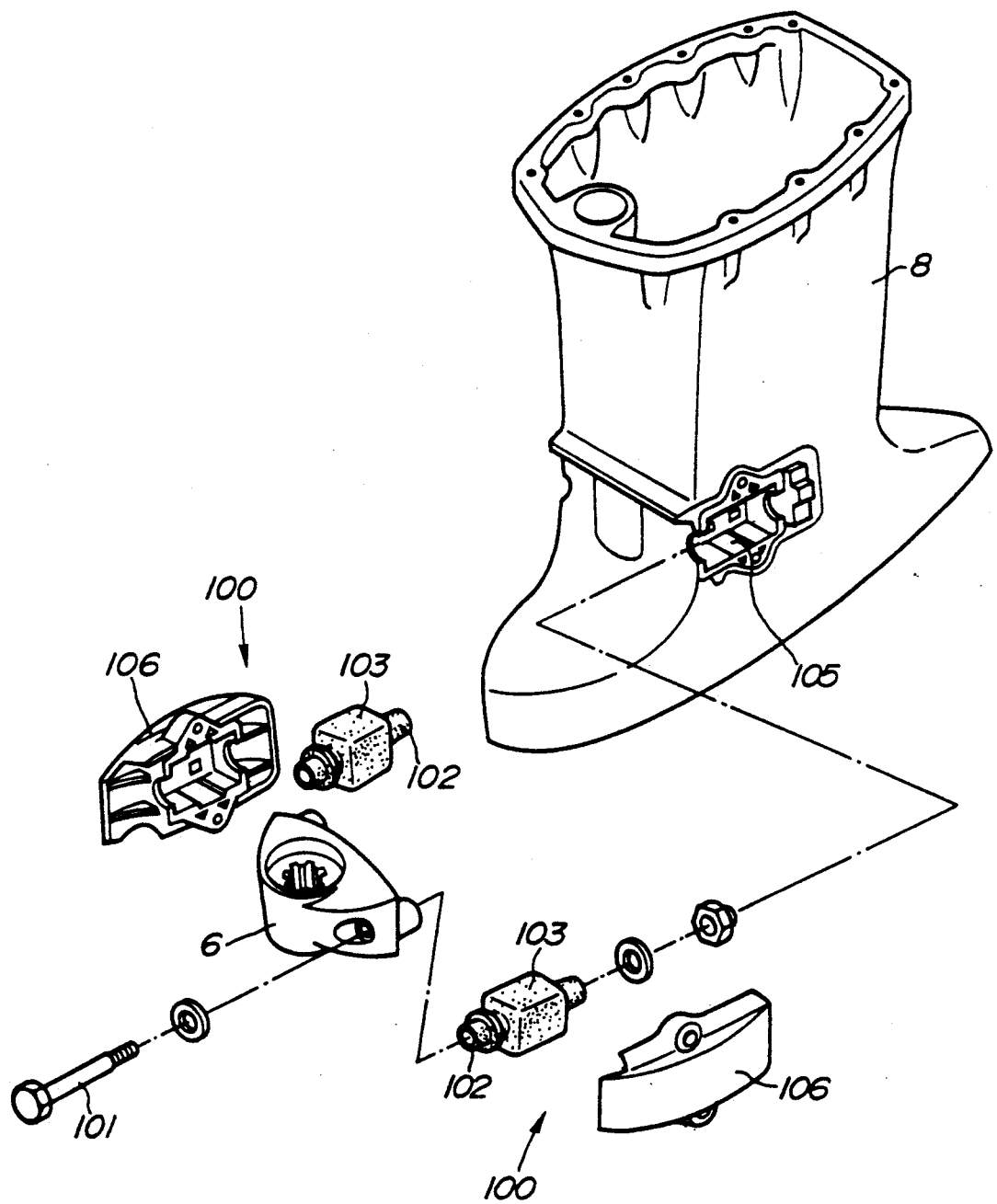
FIG. 3 is an exploded perspective view of a lower mount assembly and associated components in the joint structure according to the first embodiment.

As shown in FIG. 3, the lower mount assembly 100 has a support member comprising a pair of sufficiently rigid tubular inner members 102 of a light alloy or the like which are fastened to lateral portions of the central housing 6 by respective bolts 101, and a pair of elastic members 103 of rubber or the like integrally disposed around the respective tubular inner members 102, the elastic members 103 being joined to the inner members 102 upon vulcanization. The inner members 102 and the elastic members 103 are housed respectively in housing regions 104 defined in opposite sides of the extension case 8. In this manner, a lower portion of the outboard engine assembly A is coupled to the swivel case 3.

Figure 4:
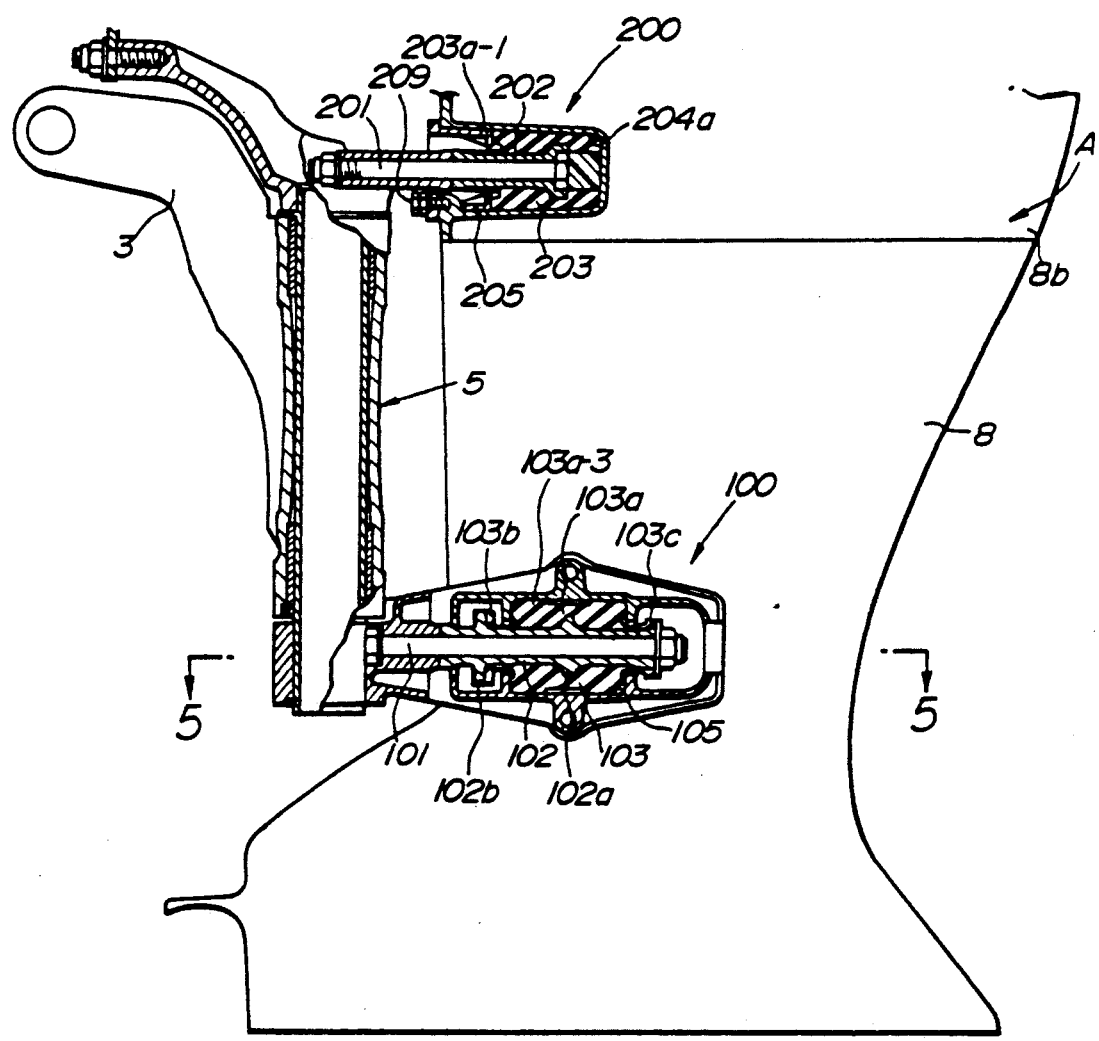
FIG. 4 is a vertical cross-sectional view of the joint structure according to the first embodiment.
Figure 5:
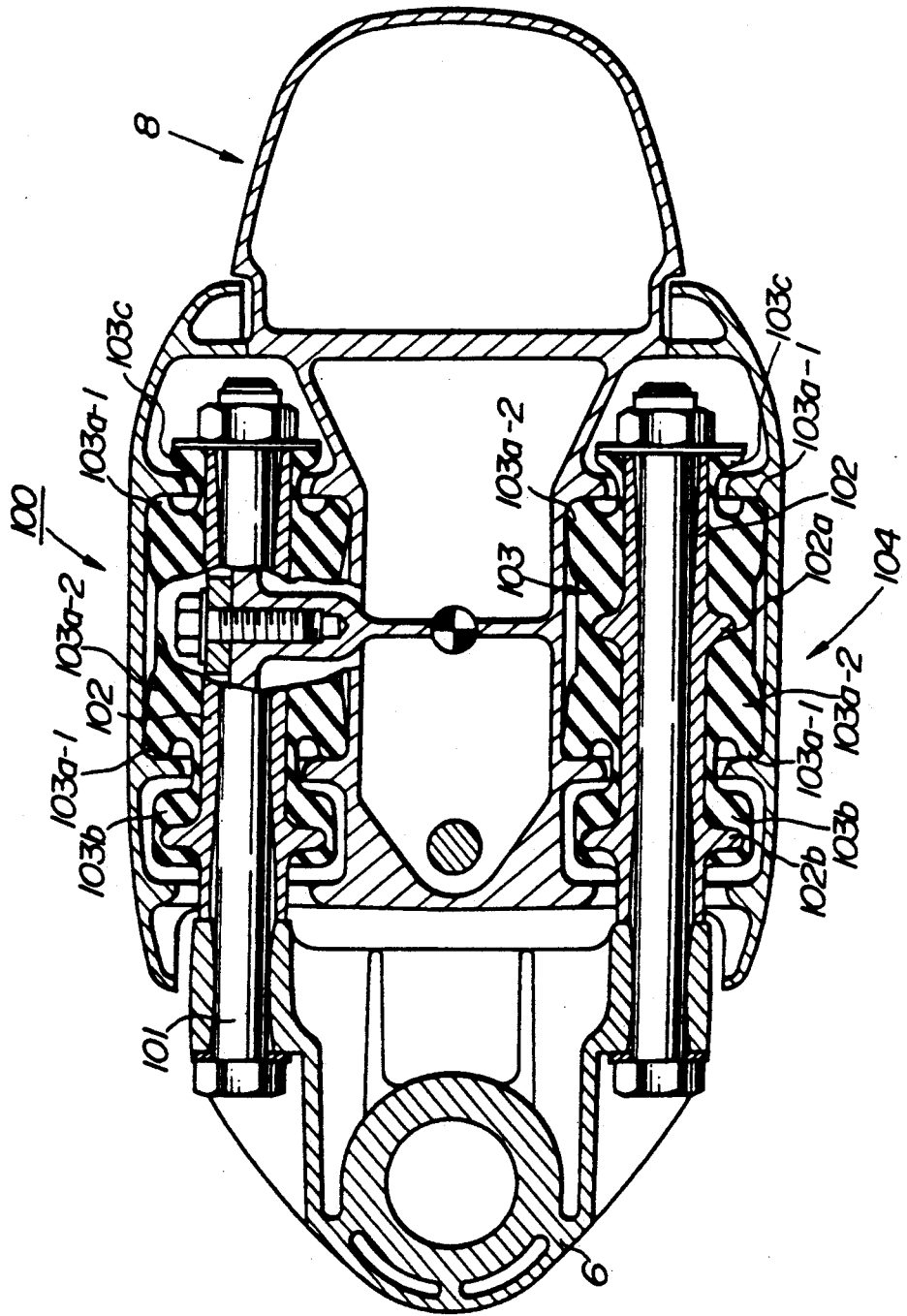
FIG. 5 is an enlarged cross-sectional view taken along line 5—5 of FIG. 4.
Figure 6:
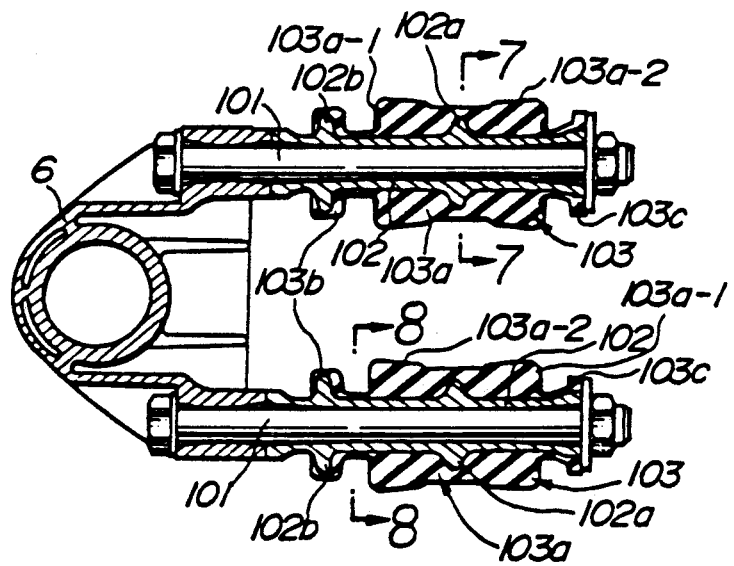
FIG. 6 is a horizontal cross-sectional view of elastic members and inner members of the lower mount assembly in the joint structure according to the first embodiment.
Figure 7:
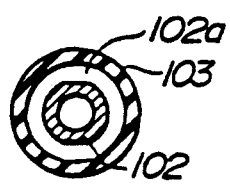
FIG. 7 is a cross-sectional view taken along line 7—7 of FIG. 6.

As shown in FIGS. 4 and 5, each of the elastic members 103 comprises a rubber body 103a, a forward rubber stopper 103b, and a rearward rubber stopper 103c. The inner member 102 has axially spaced integral flanges 102a, 102b disposed respectively in the rubber body 103a and the forward rubber stopper 103b, for limiting deformation of the rubber body 103a and the forward rubber stopper 103b. The flanges 102a, 102b serve to increase the compressive rigidity of the elastic member 103 for effective transmission of propulsive forces from the engine 10.

The rubber body 103a is in the shape of a rectangular parallelepiped having six substantially flat outer surfaces. The rubber body 103a has protrusions 103a-1 on the four corners of each of front and rear faces thereof which are spaced along the direction in which the propulsive or compressive forces are exerted, protrusions 103a-2 on the four corners of each of lateral side faces thereof which are spaced along a direction normal to the direction in which the propulsive or compressive forces are exerted, and protrusions 103a-3 on the four corners of each of upper and lower faces thereof which are also spaced along a direction normal to the direction in which the propulsive or compressive forces are exerted. The outer surfaces of the rubber bodies 103a are partly held against the inner surfaces of the housing regions 104 through these protrusions 103a-1, 103a-2, 103a-3. Such partial abutment allows the rubber bodies 103a to be easily elastically deformed for a greater dampening capability when compressive forces are applied to the rubber bodies 103a than would be if the rubber bodies 103a were held in full abutment against the inner surfaces of the housing regions 104.

When the propulsive forces are applied in the longitudinal direction of the rubber bodies 103a, the protrusions 103a-1 are completely elastically flattened to cause the front or rear faces of the rubber bodies 103a to fully engage the corresponding inner surfaces of the housing regions 104. Therefore, the rigidity of the rubber bodies 103a is increased for efficient transmission of forward or rearward propulsive forces.

While the rubber bodies 103a, the forward rubber stoppers 103b, and the rearward rubber stoppers 103c are made of rubber in the above embodiment, they may be made of any elastic material if they are elastically deformable from partial abutment to full abutment against corresponding inner surfaces of the housing regions 104 under increased compressive forces that are transmitted between the boat hull 1 and the engine 10 when the engine 10 is in operation.

Figure 9:
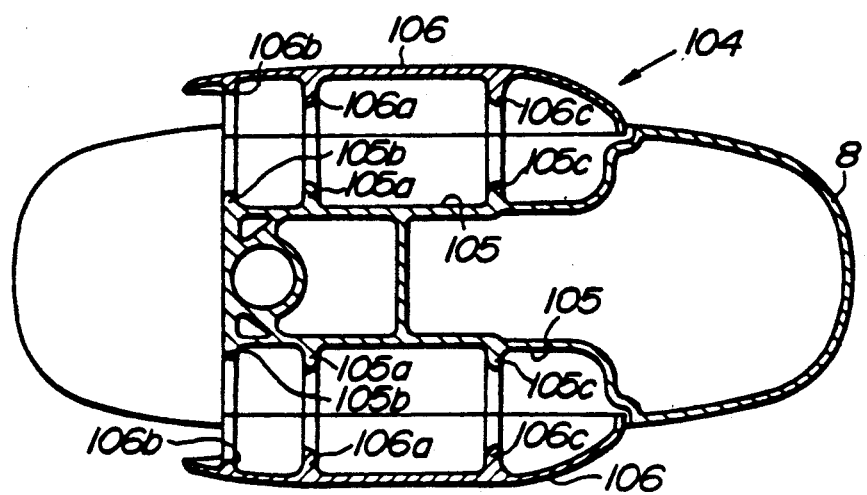
FIG. 9 is a horizontal cross-sectional view of an extension case in which the lower mount assembly according to the first embodiment is disposed.

As shown in FIG. 3, the housing regions 104 are composed of respective sufficiently rigid covers 106 of resin or light alloy which are fitted in respective recesses 105 defined in the opposite sides of the extension case 8. As shown in FIG. 9, partitions 105a, 105b, 105c and 106a, 106b, 106c are successively disposed in the recesses 105 and the covers 106 and spaced along the direction in which the propulsive or compressive forces are applied, the partitions jointly defining central openings therein. The partitions 105a, 105b, 105c and 106a, 106b, 106c divide each of the housing regions 104 into a main housing space and two auxiliary housing spaces. The rubber body 103a is accommodated in the main housing space, and the forward and rearward rubber stoppers 103b, 103c are accommodated in the respective auxiliary housing spaces. When the applied propulsive forces are increased, the forward and rearward rubber stoppers 103b, 103c are elastically deformed into abutment against the nearby partitions in order to prevent the rubber body 103a from being excessively elastically deformed in the direction in which the propulsive forces are exerted. The abutment of the forward and rearward rubber stoppers 103b, 103c increases the areas of contact between the elastic members 103 and the housing regions 104 for stable transmission of the propulsive forces.

To assemble the lower mount assembly 100, the elastic members 103 integrally disposed around the inner members 102 are placed in the respective recesses 105, and then the covers 106 are fixed to the extension case 8 in covering relation to the elastic members 103.

Figure 14A:
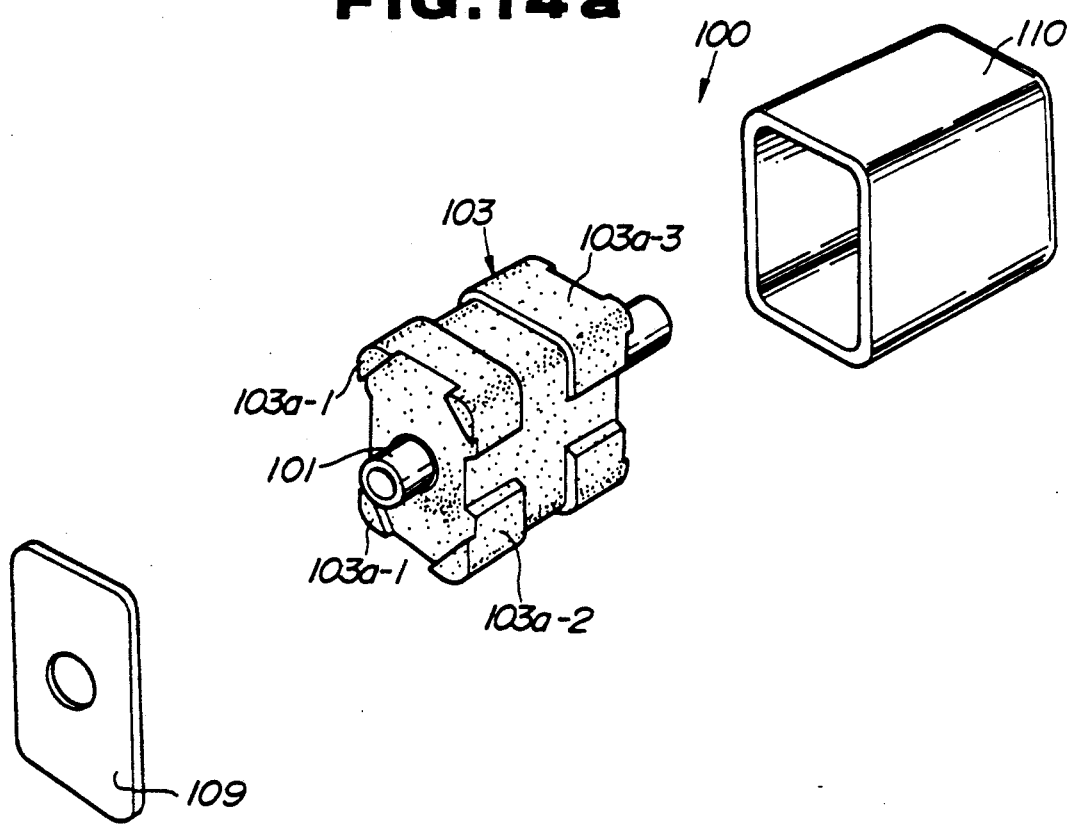
FIG. 14a is an exploded perspective view of a first modification of the lower mount assembly and its housing according to the first embodiment.
Figure 14B:
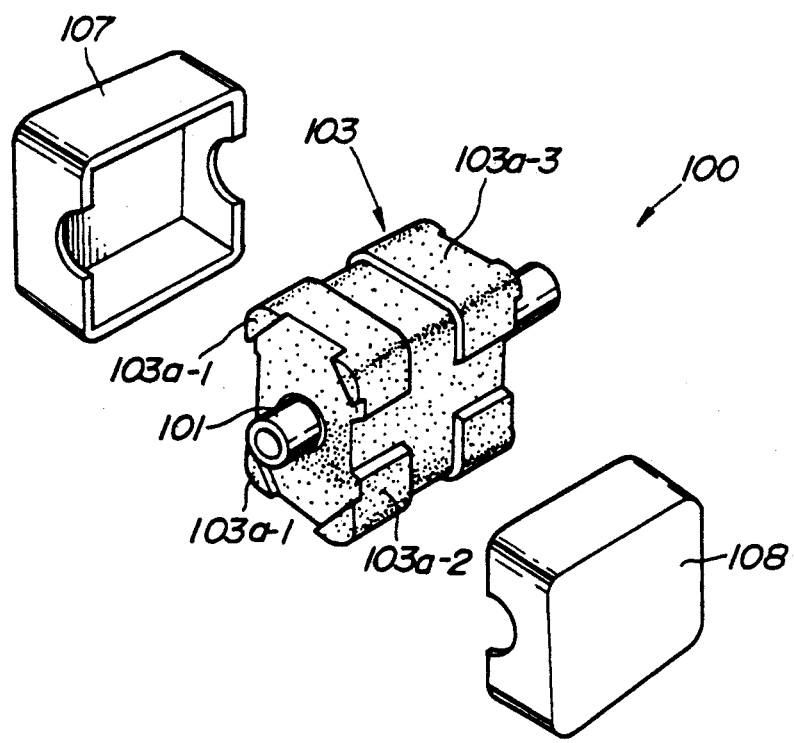
FIG. 14b is an exploded perspective view of a second modification of the lower mount assembly and its housing according to the first embodiment.
Figure 14:
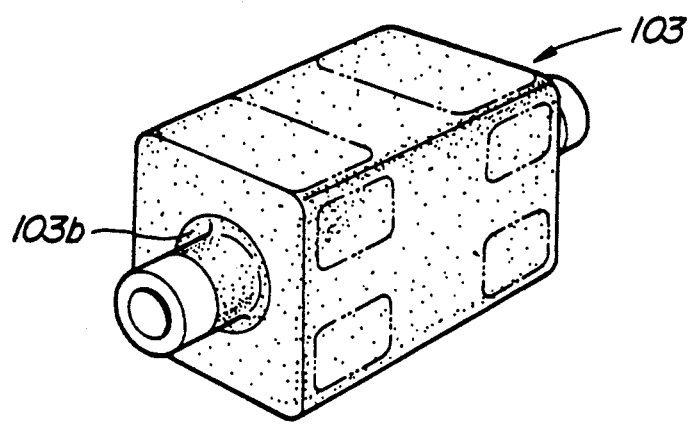
FIGS. 14c through 14h are perspective views of various modified elastic members.
Figure 14:
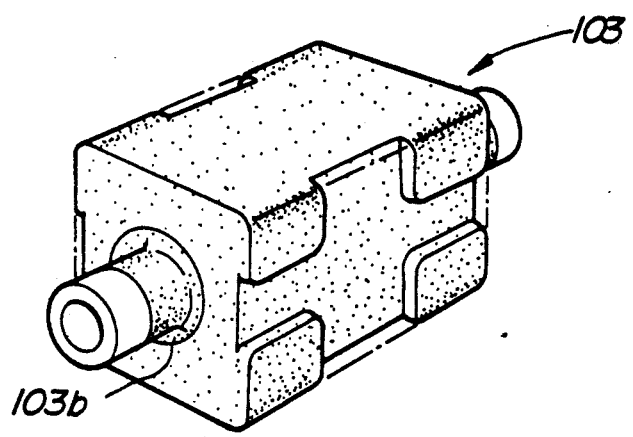
Figure 14:
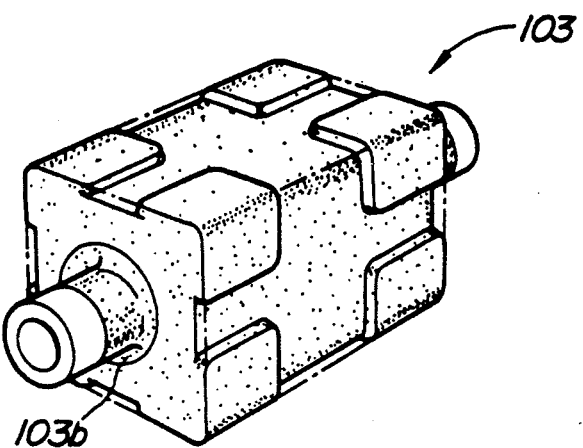
Figure 14F:
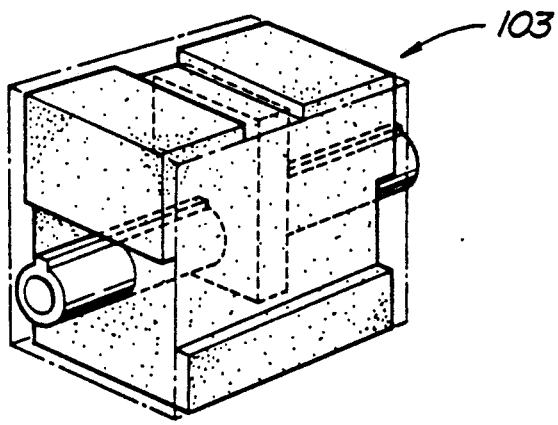
Figure 14G:
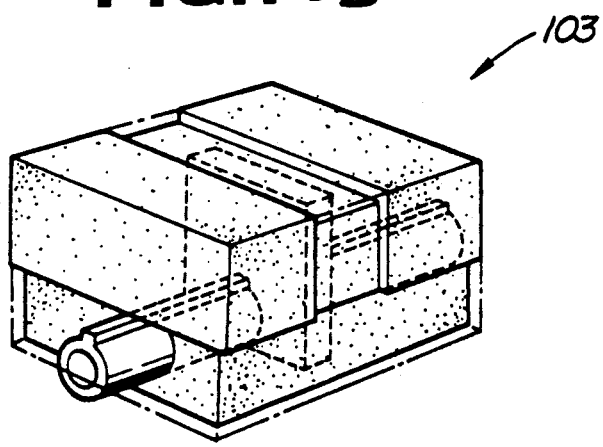

FIGS. 14a and 14b show first and second modifications, respectively, of the lower mount assembly 100 and its housing. According to the first modification shown in FIG. 14a, the elastic member 103 is accommodated in a housing 110, and a cover 109 is fitted in the housing 110 in covering relation to the elastic member 103. According to the second modification shown in FIG. 14b, the elastic member 103 is accommodated in housing halves 107, 108 which are joined together into a housing. The modified lower mount assembly 100 shown in FIG. 14a or 14b, and its housing are fitted and fixed in the recess 105 defined in each of the opposite sides of the extension case 8. In FIGS. 14a and 14b, the protrusions 103a-3 on the upper and lower faces of the elastic member 103 are joined together in the lateral direction in each of the front and rear ends of the elastic member 103, and the protrusions 103a-2 on the lateral side faces of the elastic member 103 are spaced from each other in the lateral direction in each of the front and rear ends of the elastic member 103 for a greater damping capability.

While each of the elastic members 103 has integral protrusions 103a-1, 103a-2, 103a-3 for partial abutment against the inner surfaces of the housing region 104 in the above embodiments, as better shown in FIGS. 14a and 14b, the elastic members 103 may have flat outer surfaces, and the inner surfaces of the housing regions 104 may have protrusions held in partial abutment against the flat outer surfaces of the elastic members 103.

Figure 14H:
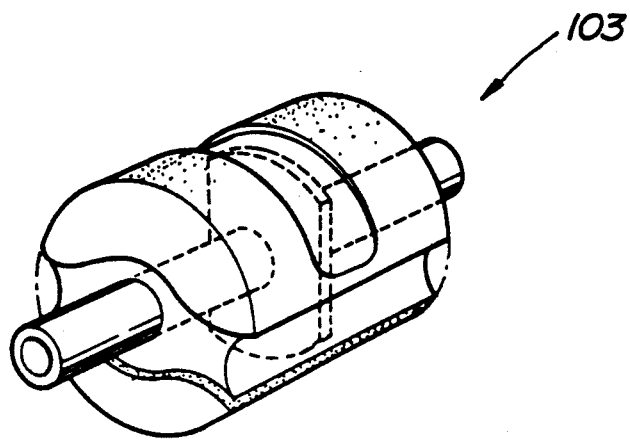
Figure 16:
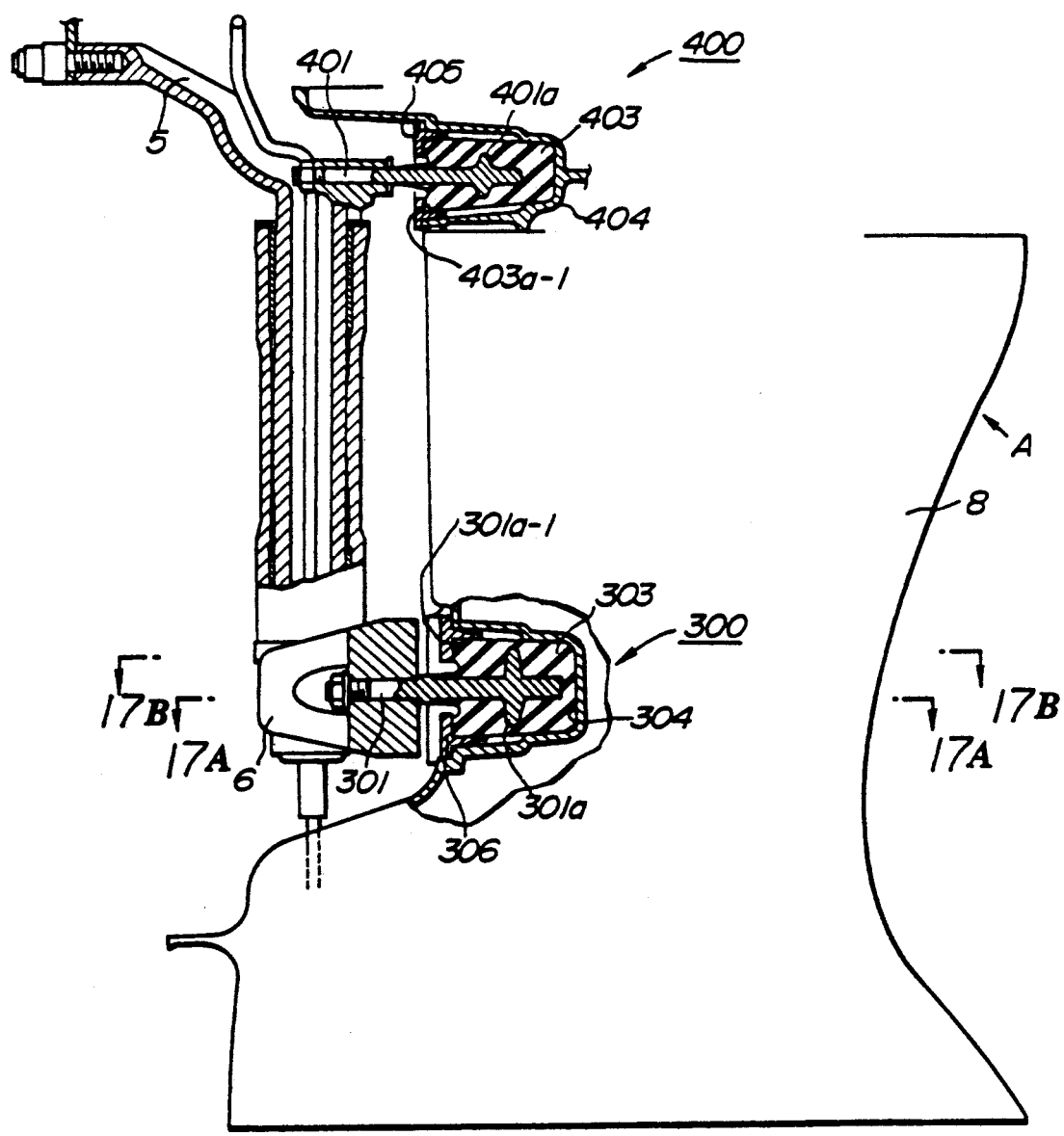
FIG. 16 is a vertical cross-sectional view of a joint structure according to a second embodiment of the present invention.
Figure 17:
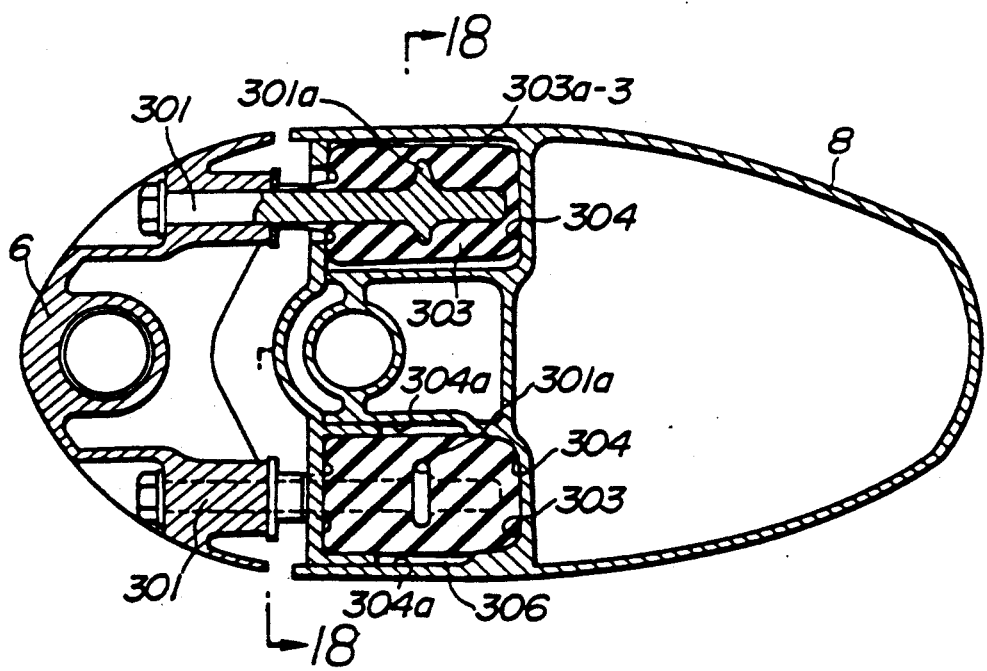
FIG. 17 is a combination of a cross-sectional view taken along line 17A—17A and a cross-sectional view taken along line 17B—17B of FIG. 16.
Figure 18:
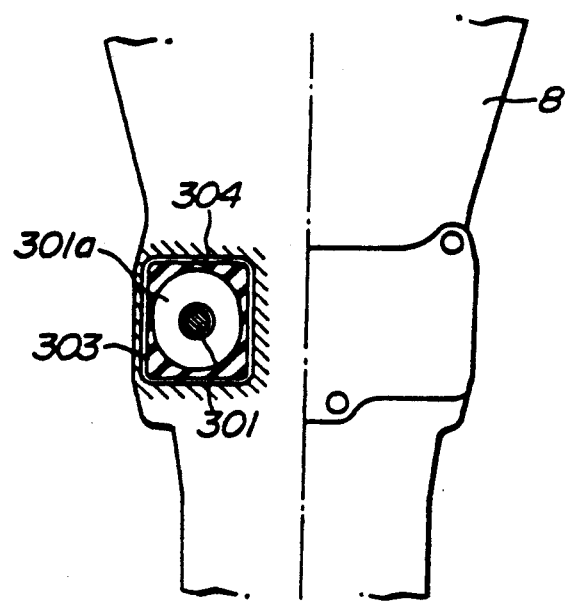
FIG. 18 is a cross-sectional view taken along line 18—18 of FIG. 17.

FIGS. 14c through 14h show various modified elastic members. The elastic member 103 shown in FIG. 14c has flat outer surfaces, and the inner surfaces of the housing region 104 has protrusions for partial abutment against the flat outer surfaces of the elastic member 103. The areas of the outer surfaces of the elastic member 103, which are to be held in abutment against the protrusions on the inner surfaces of the housing regions 104, are indicated by two-dot-and-dash lines in FIG. 14c. In FIG. 14d, the elastic member 103 has flat upper and lower faces, and has protrusions on the corners of each of the lateral side faces. In FIG. 14e, the elastic member 103 has protrusions of the same area on the corners of each of the upper, lower, and lateral side faces. Each of the elastic members 103 shown in FIGS. 14c through 14e has an annular recess 103b defined in each of the front and rear faces thereof. The elastic member 103 shown in FIG. 14f has protrusions on upper portions of the front and rear faces, protrusions on front and rear portions of the upper face, and protrusions on lower portions of the lateral side faces. The elastic member 103 shown in FIG. 14g has protrusions on upper portions of the front, rear, upper, lower, and lateral side faces, and has a horizontal dimension greater than its vertical dimension. The elastic member 103 illustrated in FIG. 14h is cylindrical in shape, and has protrusions on upper and lower portions of its outer surfaces.

In FIGS. 14a through 14h, recesses are defined between the protrusions on the elastic members 103. These recesses serve as flexing areas to allow the elastic members to be elastically deformed greatly for larger damping capability between the outer surfaces of the elastic members and the inner surfaces of the housing regions when the elastic members are stretched when vertical or lateral vibrations are applied between the housing regions and the elastic members. Therefore, the flexing areas are effective to absorb such vertical or lateral vibrations.

The upper mount assembly 200 will be described below with reference to FIGS. 2, 4, and 11a through 13.

The upper mount assembly 200 has a support member comprising a pair of tubular inner members 202 fastened to the attachments 5b, respectively, of the swivel shaft 5a by respective bolts 201, and a pair of elastic members 203 of rubber or the like integrally disposed around the inner members 202, respectively, the elastic members 203 being joined to the inner members 202 upon vulcanization. The elastic members 203 on the inner members 202 are accommodated respectively in housing regions 204 defined in the extension case 8, and covered by caps 205. In this manner, an upper portion of the outboard engine assembly A is coupled to the swivel case 3.

As shown in FIG. 2, each of the housing regions 204 comprises a recess 204a defined in a member 8b coupled to the extension case 8 and opening at a front wall of the member 8b which faces the swivel case 3. As shown in FIGS. 11a and 11b, the cap 205 has a rearwardly extending portion 205a holding the elastic member 203, and a flange 205b fastened to the front portion of the extension case 8, i.e., the front wall of the member 8b, by a bolt 209 or the like.

The rearwardly extending portion 205a of the cap 205 comprises abutment surfaces 205a-1 on upper and lower portions of a rear end face thereof, and a rearward protrusion 205a-2 which projects rearwardly from the abutment surfaces 205a-1 by a distance L3.

As shown in FIG. 13, the elastic member 203 has protrusions 203a-1 on upper and lower portions of a front end face thereof, and laterally spaced flat faces 203a-2 disposed one on each side of the protrusions 203a-1, the protrusions 203a-1 projecting forwardly from the flat faces 203a-2 by a distance L4. The protrusions 203a-1 partially abut against the abutment surfaces 205a-1 of the rearwardly extending portion 205a of the cap 205 when the engine 10 rotates in a low speed range, i.e., produces small propulsive forces. The elastic member 203 has a plurality of air releasing grooves 203a-3 defined in its side faces for releasing air when the elastic member 203 is placed into the housing region 204.

When assembled, the protrusions 203a-1 of the elastic member 203 abut against the respective abutment surfaces 205a-1 of the cap 205, and the flat faces 203a-2 of the elastic member 203 face and are spaced from the rearward protrusion 205a-2 of the cap 205 by a distance which is equal to the difference (L4–L3) between the distances L4, L3.

Stated otherwise, the protrusions 203a-1 projecting from the flat faces 203a-2 of the elastic member 203 are inserted respectively in the recesses defined by the abutment surfaces 205a-1 in the rearward protrusion 205a-2 of the cap 205. The depth of these recesses is smaller than the projection of the protrusions 203a-1. When the propulsive forces from the engine 10 are increased, the protrusion 205a-2 of the cap 205 and the flat faces 203a-2 of the elastic member 203 are brought into full abutment against each other before the protrusions 203a-1 are fully flattened.

Figure 22:
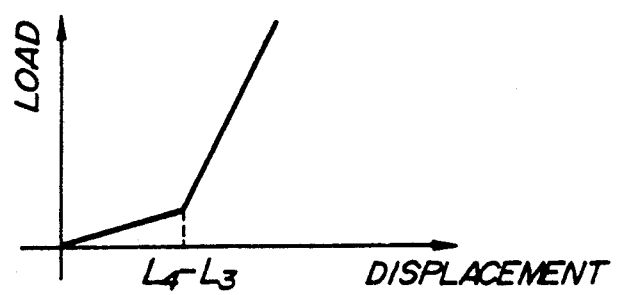
FIG. 22 is a graph showing the relationship between the load on and the displacement of the upper mount assembly shown in FIGS. 11a and 11b.

When the outboard engine assembly A is in operation to propel the boat forwardly, the upper mount assembly 200 is elastically deformed nonlinearly as the load applied thereto varies, as shown in FIG. 22.

FIG. 15 shows a modification of the upper mount assembly 200 and its housing. In FIG. 15, the elastic member 203 is accommodated in a housing 207, and a cover 206 is fitted in the housing 207 in covering relation to the elastic member 203. The elastic member 203 may alternatively be accommodated in front and rear housing halves (not shown) which are joined together into a housing, similar to the housing halves 107, 108 shown in FIG. 14b. The upper mount assembly 200 accommodated in the housing is fitted in the extension case 8 or in each of the recesses 204a defined in the member 8b fastened to the extension case 8. In FIG. 15, the elastic member 203 has protrusions 203a-1 each substantially of a trapezoidal shape on upper and lower portions of each of the front and rear end faces thereof.

Figure 8:
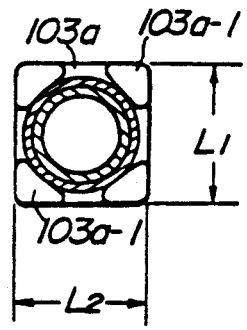
FIG. 8 is a cross-sectional view taken along line 8—8 of FIG. 6.

As shown in FIGS. 8 and 13, each of the elastic members 103, 203 has a horizontal dimension L2 smaller than its vertical dimension L1 for greater damping capability in the lateral direction. In the case where the vertical dimension L1 is greater than the horizontal dimension (L1>L2) and the horizontal dimension L2 is smaller than a conventional horizontal dimension L2' (L2<L2'), the axes of the bolts 101, 201 extending rearwardly from the mount frame 5 are made closer to the torque roll axis TL (FIG. 1), about which reactive forces are produced in response to the drive torque of the engine, by the difference L2'–L2, thus increasing the damping capability in the lateral direction when the engine operates in a low speed range. Changes in the free surfaces of the elastic member 203, which are caused by the difference L2'–L2, are compensated for by making the vertical dimension L1 greater than a conventional vertical dimension L1' (L1>L1').

Figure 10:
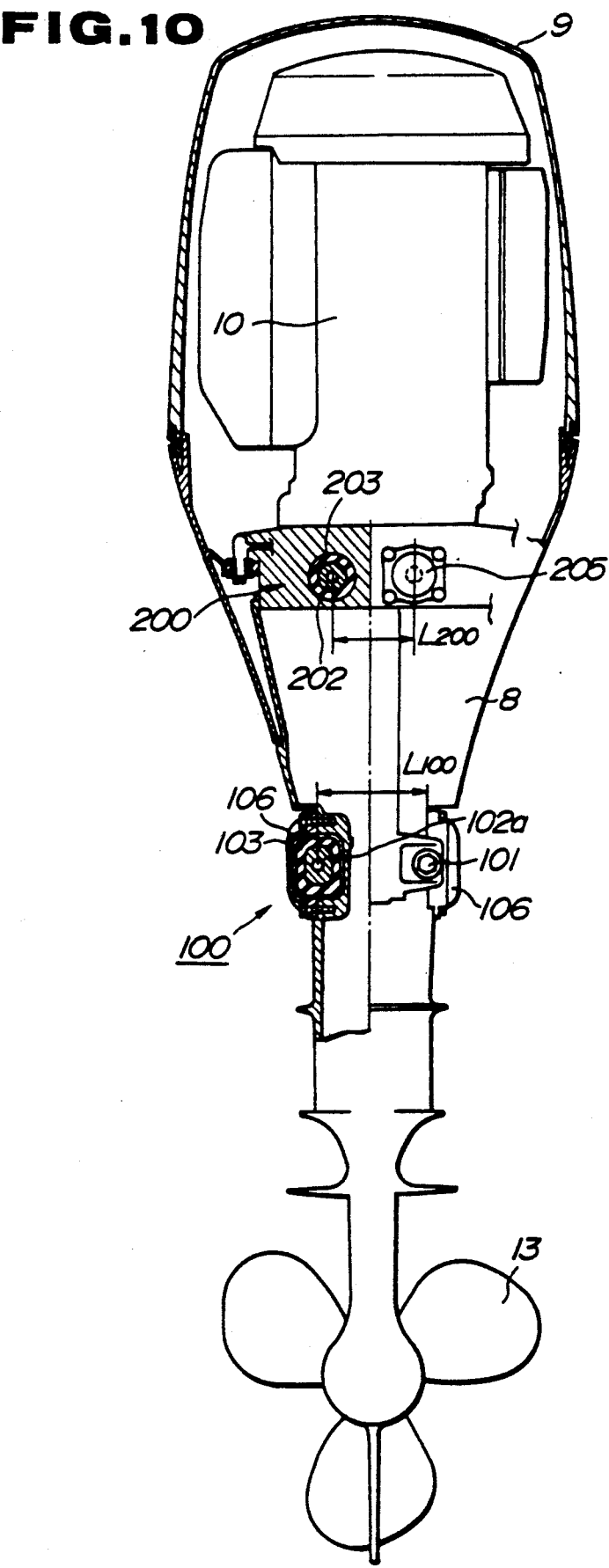
FIG. 10 is a front elevational view, partly in cross section, of the outboard engine assembly coupled to the joint structure according to the first embodiment.

As shown in FIG. 10, the distance L200 between the central axes of the inner members 202 of the upper mount assembly 200 is smaller than the distance L100 between the central axes of the inner members 102 of the lower mount assembly 100. This arrangement increases the damping capability of the upper mount assembly 200 relative to the lower mount assembly 100, while at the same time permitting each of the elastic members 203 on the inner members 202 to be kept rigid as desired, so that the user is given a preferable steering feeling when steering the boat.

When the damping capability of the elastic member 103, which is of a rectangular parallelepiped, is to be increased, the housing 110, 109 or 107, 108 (FIGS. 14a, 14b) which accommodates the elastic member 103 may be turned 90° and fitted into the recess in the extension case 8.

FIGS. 16 through 21 show a joint structure according to a second embodiment of the present invention. Those parts shown in FIGS. 16 through 21 which are identical to those of the joint structure according to the first embodiment are denoted by identical reference numerals, and will not be described in detail.

The joint structure according to the second embodiment also includes a lower mount assembly 300 and an upper mount assembly 400 by which the outboard engine assembly A is coupled to the mount frame 5.

The lower mount assembly 300 has a support member comprising a pair of bolts 301 having respective flanges 301a and attached to laterally spaced portions of the central housing 6 on the lower end of the mount frame 5, and a pair of elastic members 303 of rubber or the like integrally disposed around the respective bolts 301, the elastic members 303 being joined to the bolts 301 upon vulcanization. The elastic members 303 on the bolts 301 are accommodated respectively in housing regions 304 defined in the opposite sides of a lower portion of the extension case 8, and are covered with respective caps 305. A lower portion of the outboard engine assembly A is thus coupled to the swivel case 3.

The joint structure according to the second embodiment does not have forward and rearward rubber stoppers as with the first embodiment. Each of the elastic members 303 has protrusions 303a-1 on its front face for absorbing vibrations when the propulsion forces from the engine are small, flat upper and lower faces, and grooves 303a-3 in lateral side faces thereof. Each of the housing regions 304 has recesses 304a, leaving gaps 306 between the inner surfaces of the housing region 304 and the outer surfaces of the elastic member 303 so that the inner surfaces of the housing region 304 and the outer surfaces of the elastic member 303 are held in partial abutment against each other.

The upper mount assembly 400 comprises a support member comprising a pair of bolts 401 having respective flanges 401a and attached to laterally spaced portions of an upper portion of the mount frame 5, and a pair of elastic members 403 integrally disposed around the bolts 401, respectively. The elastic members 403 on the bolts 401 are fitted in respective housing regions 404 defined in an upper portion of the extension case 8, and are covered with respective caps 405.

Figure 19:
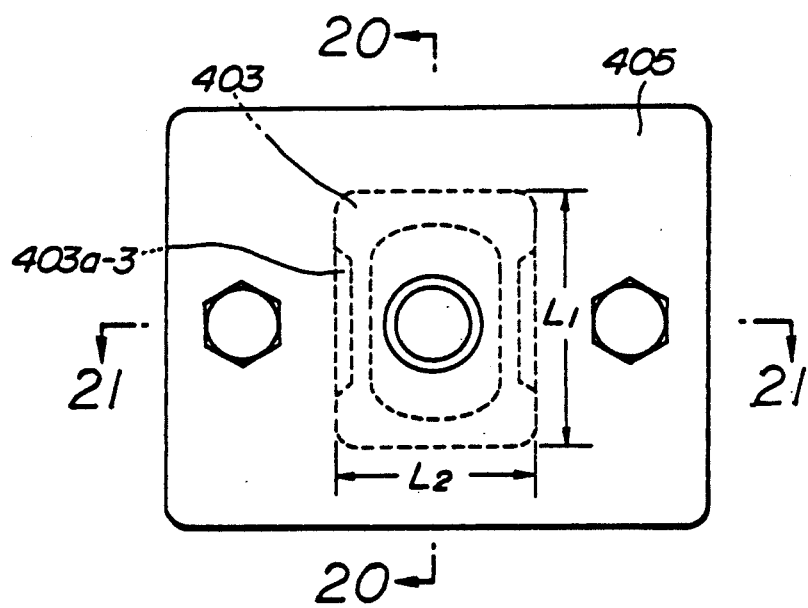
FIG. 19 is a front elevational view of a lower mount assembly in the joint structure according to the second embodiment.
Figure 20:
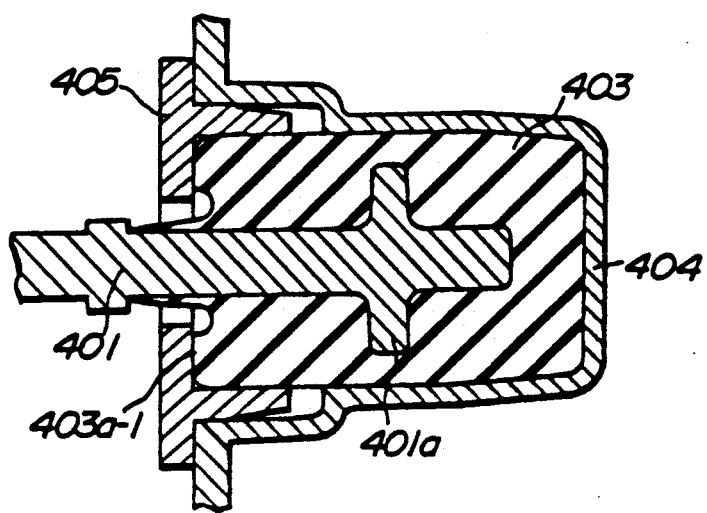
FIG. 20 is a cross-sectional view taken along line 20—20 of FIG. 19.
Figure 21:
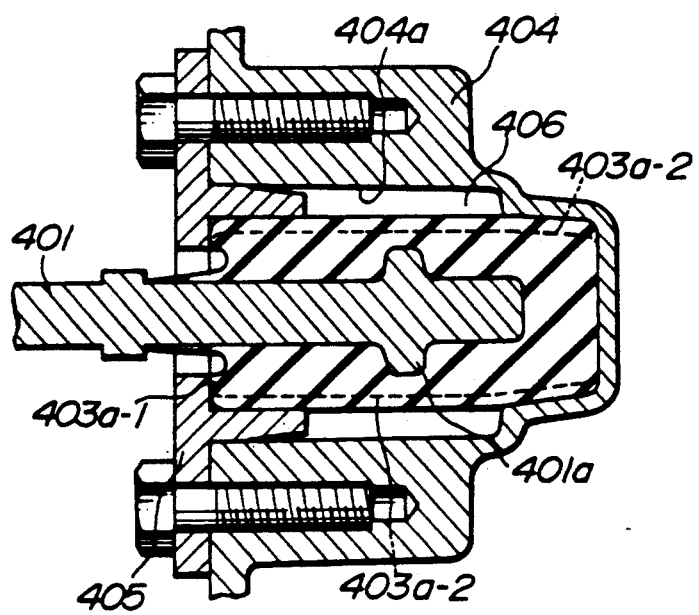
FIG. 21 is a cross-sectional view taken along line 21—21 of FIG. 19.

As shown in FIGS. 19 through 21, the horizontal dimension L2 of each of the elastic members 403 is smaller than the vertical dimension L1 thereof to provide greater damping capability in the lateral direction. The elastic member 403 has a protrusion 403a-1 on its front face for partial abutment against the cap 405 to absorb vibrations sufficiently when the transmitted propulsive forces are small. The elastic member 403 has flat upper and lower faces without protrusions because it should be more effective to bear the weight of the engine than to absorb small vertical vibrations. The elastic member 403 also has grooves 403a-2 in lateral side faces thereof. Each of the housing regions 404 has recesses 404a, leaving gaps 406 between the inner surfaces of the housing region 404 and the outer surfaces of the elastic member 403 so that the inner surfaces of the housing region 404 and the outer surfaces of the elastic member 403 are held in partial abutment against each other.

The joint structure according to the present invention, when used between the boat hull and the outboard engine assembly, offers the following advantages:

When the propulsive forces from the outboard engine assembly are not so large, such as right after the outboard engine assembly is started, the outer surfaces of the elastic members and the inner surfaces of the housings which accommodate the elastic members are held in partial abutment against each other, thus providing a greater damping capability in the direction in which the propulsive forces are transmitted, for sufficient absorption of vibrations.

When the propulsive forces transmitted from the outboard engine assembly to the boat hull are increased, the outer surfaces of the elastic members and the inner surfaces of the housings are brought into full abutment against each other. The elastic member is now rendered rigid in the direction in which the propulsive forces are applied, thereby efficiently transmitting the propulsive forces.

Since the upper, lower, and lateral side faces of the elastic members are held in partial abutment against the corresponding inner surfaces of the housings, the elastic members are effective to absorb vibrations in the directions normal to the direction in which the propulsive forces are transmitted.

The joint structure according to the present invention is relatively simple in structure, can bear the weight of the outboard engine assembly, is sufficiently rigid when the outboard engine assembly is turned to steer the boat, and can easily be manufactured.

Furthermore, the upper and lower mount assemblies according to the present invention can be designed easily with clearer changeover points for changeover between a greater damping capability and a smaller damping capability than the conventional elastic members, and hence can easily be incorporated in joint structures. The joint structure can provide a greater damping capability even when it is used in combination with conventional extension case widths.

Although there have been described what are at present considered to be the preferred embodiments of the present invention, it will be understood that the invention may be embodied in other specific forms without departing from the essential characteristics thereof. The present embodiments are therefore to be considered in all aspects as illustrative, and not restrictive. The scope of the invention is indicated by the appended claims rather than by the foregoing description.

We claim:

1. A joint structure for joining an outboard engine assembly to a boat hull, comprising:
    an outboard engine assembly having an engine, a case, a propeller rotatably supported on said case and drivable by said engine;
    an attachment adapted to be coupled to a boat hull;
    said case having an inner surface defining an inner housing region;
    elastic mount means accommodated in said inner housing region, for elastically coupling said case to said attachment; and
    said elastic mount means comprising a support member coupled to said attachment, and an elastic member disposed on said support member, said elastic member being elastically deformable from partial abutment to full abutment against a portion of said inner surface of said case in response to an increase in compressive forces which are applied between said case and said attachment when said engine is in operation.

2. A joint structure according to claim 1, wherein said portion of the inner surface includes a flat inner surface substantially normal to the direction in which said compressive forces are applied, said elastic member having an outer surface facing said flat inner surface and having a plurality of protrusions elastically deformable from partial abutment to full abutment against said flat inner surface when said compressive forces are increased.

3. A joint structure according to claim 1, wherein said portion of the inner surface includes an inner surface substantially normal to the direction in which said compressive forces are applied, said substantially normal inner surface having a plurality of protrusions, said elastic member having a flat outer surface facing said substantially normal inner surface and elastically deformable from partial abutment to full abutment against said protrusions and said substantially normal inner surface when said compressive forces are increased.

4. A joint structure according to claim 1, wherein said inner surface includes a flat inner surface parallel to the direction in which the compressive forces are applied, said elastic member having an outer surface facing said flat inner surface and having at least one protrusion with a relatively large damping capability for absorbing vibrations produced when said engine is in operation.

5. A joint structure according to claim 1, wherein said support member has an integral flange embedded in said elastic member and extending in a direction normal to the direction in which said compressive forces are applied.

6. A joint structure according to claim 5, wherein said inner surface includes a flat inner surface parallel to the direction in which the compressive forces are applied, said elastic member having an outer surface facing said flat inner surface and held in partial abutment against said flat inner surface, providing a flexing portion with a relatively large damping capability for absorbing vibrations produced when said engine is in operation.

7. A joint structure according to claim 1, wherein said case has a plurality of partitions which divide said inner housing region into a successive array of a first auxiliary housing space, a main housing space, and a second auxiliary housing space, said partitions having openings through which said housing spaces are connected, said support member and said elastic member being accommodated in said first auxiliary housing space, said main housing space, and said second auxiliary housing space and extending through said openings, said elastic member comprising a first elastic stopper accommodated in said first auxiliary housing space, a main elastic body accommodated in said main housing space, and a second elastic stopper accommodated in said second auxiliary housing space, said first and second elastic stoppers being engageable with corresponding ones of said partitions to prevent said main elastic body from being excessively elastically deformed in the direction in which said compressive forces are applied, when the compressive forces are applied between said case and said attachment when said engine is in operation.

8. A joint structure according to claim 1, wherein said portion of the inner surface includes an inner surface substantially normal to the direction in which said compressive forces are applied, said substantially normal inner surface having a plurality of recesses, said elastic member having an outer surface facing said substantially normal inner surface and having a plurality of protrusions insertable into said recesses, said protrusions projecting by a dimension which is selected with respect to the depth of said recesses such that when said compressive forces are increased, said outer surface and said substantially normal inner surface are brought into full abutment against each other before said protrusions are fully flattened, whereby said elastic member is elastically deformable nonlinearly with respect to said compressive forces.

9. A joint structure according to claim 1, wherein said support member and said elastic member jointly serve as upper mount means for joining said case and an upper portion of said attachment, said elastic mount means further including lower mount means for joining said case to a lower portion of said attachment, said lower mount means comprising a support member and an elastic member disposed on said support member.

10. A joint structure according to claim 9, wherein each of the elastic members of said upper and lower mount means having a horizontal dimension smaller than a vertical dimension thereof for a greater damping capability in a horizontal direction.

11. A joint structure according to claim 9, wherein said upper mount means further comprises a cap for securing said elastic member in position between said case and said attachment.

12. A joint structure according to claim 11, wherein said cap has at least one recess defined in a surface thereof facing said elastic member, said elastic member has at least one protrusion formed on a surface thereof facing said cap, and said protrusion engages said recess to hold said cap and said elastic member in partial abutment against each other when the compressive forces applied between said case and said attachment are relatively small.

13. A joint structure according to claim 12, wherein said protrusion is flattenable to bring said cap surface and said elastic member surface into full abutment against each other when the compressive forces applied between said case and said attachment are relatively large.

14. A joint structure according to claim 13, wherein a depth of said recess is smaller than a projecting length of said protrusion such that said cap surface and said elastic member surface may be brought into full abutment against each other before said protrusion is fully flattened.

15. A joint structure for joining two members which are spaced from each other and to which compressive forces are applicable, comprising:
    elastic mount means for elastically connecting the two members, said elastic mount means having an inner member coupled to one of said two members and an elastic member fixed around said inner member;
    said elastic member being disposed in a recess defined in the other of said two members, said elastic member having an outer surface which extends substantially perpendicularly to the direction in which the compressive forces are applied, said recess of said other member being defined by an inner surface facing said outer surface, at least one of said outer surface and said inner surface having at least one protrusion which holds said outer and said inner surfaces in partial abutment against each other when the compressive forces applied to said two members are relatively small, said elastic member being deformable relative to said protrusion to bring said outer and inner surfaces into full abutment against each other when the compressive forces applied to said two members are relatively large.

* * * * *